United States Patent [19]

Davis

[11] Patent Number: 5,431,215
[45] Date of Patent: Jul. 11, 1995

[54] PRESSURE SWITCH FOR ENERGY RECOVERY VENTILATOR

[75] Inventor: George B. Davis, Frederick, Md.

[73] Assignee: Honeywell Inc., Minneapolis, Minn.

[21] Appl. No.: 176,171

[22] Filed: Dec. 30, 1993

[51] Int. Cl.$^6$ ............................................. F24F 11/04
[52] U.S. Cl. ..................................... 165/11.1; 165/16; 165/17; 165/54
[58] Field of Search ................... 165/54, 16, 17, 909, 165/11.1

[56] References Cited

U.S. PATENT DOCUMENTS

| | | | |
|---|---|---|---|
| 4,228,849 | 10/1980 | Heinola | 165/909 |
| 4,653,574 | 3/1987 | Quinlisk et al. | 165/54 |
| 5,024,263 | 6/1991 | Laine et al. | 165/54 |

FOREIGN PATENT DOCUMENTS

| | | | |
|---|---|---|---|
| 3144276 | 9/1982 | Germany | 165/54 |
| 0625197 | 9/1978 | U.S.S.R. | 165/16 |

OTHER PUBLICATIONS

Air-to-Air Heat Exchangers Directory & Buyer's Guide, Cutler Information Corp., 1987.

*Primary Examiner*—John K. Ford
*Attorney, Agent, or Firm*—Ian D. MacKinnon

[57] ABSTRACT

A pressure switch for an energy recovery ventilator. The energy recovery ventilator for exchanging indoor air with outdoor air. The energy recovery ventilator having a housing including a first, and a second input port, and, a first and a second exhaust port, and a heat exchanger core. The energy recovery ventilator further having a first blower for drawing indoor air into said energy recovery ventilator through said first input port, through said heat exchanger core and out said first exhaust port, and a second blower for drawing outdoor air into said energy recovery ventilator through said second input port, through said heat exchanger core and out said second exhaust port. The pressure switch for determines if there is balanced air flow through the energy recovery ventilator. The pressure switch comprises means for sensing the pressure at the heat exchanger core near all four ports. The pressure switch then determines the mean average of the pressure at the core near the first input port and the pressure near the second output port. The pressure switch then determines the mean average of the pressure at the core near the second input port and the pressure near the first output port. By comparing the first mean average with the second mean average, when the mean averages are substantially similar the air flow is balanced.

4 Claims, 10 Drawing Sheets

PRESSURE SWITCH FOR ENERGY RECOVERY VENTILATOR

BACKGROUND OF THE INVENTION

This invention relates to an air exchanger for replacing indoor air in an enclosure with outdoor air and, more particularly, to an air exchanger which includes a heat exchanger which changes the temperature of the outdoor air as it enters the building to a temperature approaching that of the indoor air temperature.

In recent years there has been an increased emphasis on energy conservation in homes and other buildings in response to increasing fuel costs and decreasing and less readily available worldwide fuel supplies. This emphasis has included efforts to make residential and commercial buildings increasingly energy efficient such that less electricity and heating fuel are required to heat and cool them. Such efforts have included, for example, providing highly insulating multiple pane windows and doors, increasing the insulation ratings in walls, attics and ceilings, providing unique outer wall constructions having closed insulating air gaps, and incorporating radiant energy reflecting materials in buildings. These efforts have substantially reduced energy consumption by decreasing heat transfer between the interiors of the buildings and the outdoors.

Despite the beneficial energy conservation that has been achieved by these efforts, they have at the same time created a number of undesirable and potentially hazardous effects. More particularly, by making buildings more energy efficient by reducing air leakage around windows, doors and other areas, healthful air circulation between the indoors and the outdoors has been significantly reduced. Consequently, the indoor air has become increasingly stale due to a significant increase in the levels of dirt, mold, bacteria, fungus, dust, carbon, nitrogen, radon, and other contaminants which have consequently created unhealthy indoor environments. These undesirable effects have been most pronounced in the colder regions of the United States and in other cold-climate countries, where efforts to decrease energy consumption have been most highly concentrated. Accordingly, in these places, the levels of indoor contaminants have been especially high and have raised the most serious health concerns.

In light of the simultaneous goals of energy conservation and maintaining healthy indoor environments, a number of attempts to make efficient air-to-air heat exchangers have been made. See Energy Design Update, "Air-to-Air Heat Exchangers," 1987 Cutler Information Corp. There is still a need for an air exchanger which is energy efficient and comprises a heat exchanger having a high heat transfer efficiency so that it is capable of continuously supplying fresh outdoor air into a room at a temperature approaching the indoor temperature to minimize any subsequent indoor heating or cooling effects. The air-to-air heat exchanger must provide a significant air exchange without loss of heat and without creating negative pressures inside the home or building.

Most heat exchangers require some form of a means to prevent frost from forming and/or defrost the heat exchanger if it does form. Most commonly electric heaters are used to either preheat cold air prior to entering the heat exchanger or to defrost the cores when frost accumulates. Timers occasionally supplemented with external temperature sensors are often used to initiate the defrost heaters. These methods consume a large amount of energy and when timers are used may be energizing the heaters unnecessarily. To prevent the unnecessary cycling of the defrosting means while still insuring that the defrosting means is utilized when needed, applicant herein discloses an unique pressure sensor to determine when the heat core is constricted. The pressure switch is also useful during initial installation to balance both blowers and thereby prevent negative pressure build up in the home.

Such an air exchanger would provide needed air circulation to assure healthy home and workplace environments that, to date, have been sacrificed at the expense of increased energy conservation, without detracting from the energy conservation gains that have been made.

SUMMARY OF THE INVENTION

The present invention has been made in view of the inadequacies of the prior art and has as an object to provide an air exchanger which continuously supplies fresh air to the indoors by constantly exchanging indoor air with outdoor air. More specifically the object of the present invention is to provide a new and improved method of defrosting heat exchanger cores.

The ERV comprises a heat exchanger for transferring heat between the indoor and outdoor air streams as they travel through the air exchanger. The heat exchanger extends between the top wall and the bottom wall, and has a continuously corrugated and pleated structure which defines a plurality of alternating first channels and second channels. The first channels are open toward the front wall and closed toward the rear wall, and the second channels are open toward the rear wall and closed toward the front wall.

In cold climates cold outside air passes into the first channels of the heat exchanger and flows upward and outward into the building. Warm moist air travels into the second channels of the heat exchanger, down and is exhausted out of the building. As this process takes place the moisture from the indoor air condenses and freezes on the bottom of the heat core. When this occurs a pressure sensor detects a constriction in the heat core and closes. When the pressure switch closes, dampers at both output ports of the ERV close. Bypass channels are provided and are opened to allow air to continually cycle through the ERV. At the same time the blowers are both set to high to increase air flow and waste heat from the blower motors. The combination of the blower motor waste heat and the increased air flow defrosts the heat core.

The pressure switch operates by first sensing the mean average of one input port at the core and one output port at the core. The input port and output port are for the opposing air streams. The switch also senses the mean average of the second input port and the second output port. It is important to note that the pressure is being sensed at the heat-core. By comparing these two mean averages it is possible to both balance the speed of the blower fans and determine when excessive frost has built up on the heat exchanger.

DETAILED DESCRIPTION OF THE PREFERRED EMBODIMENT

Figure 1:
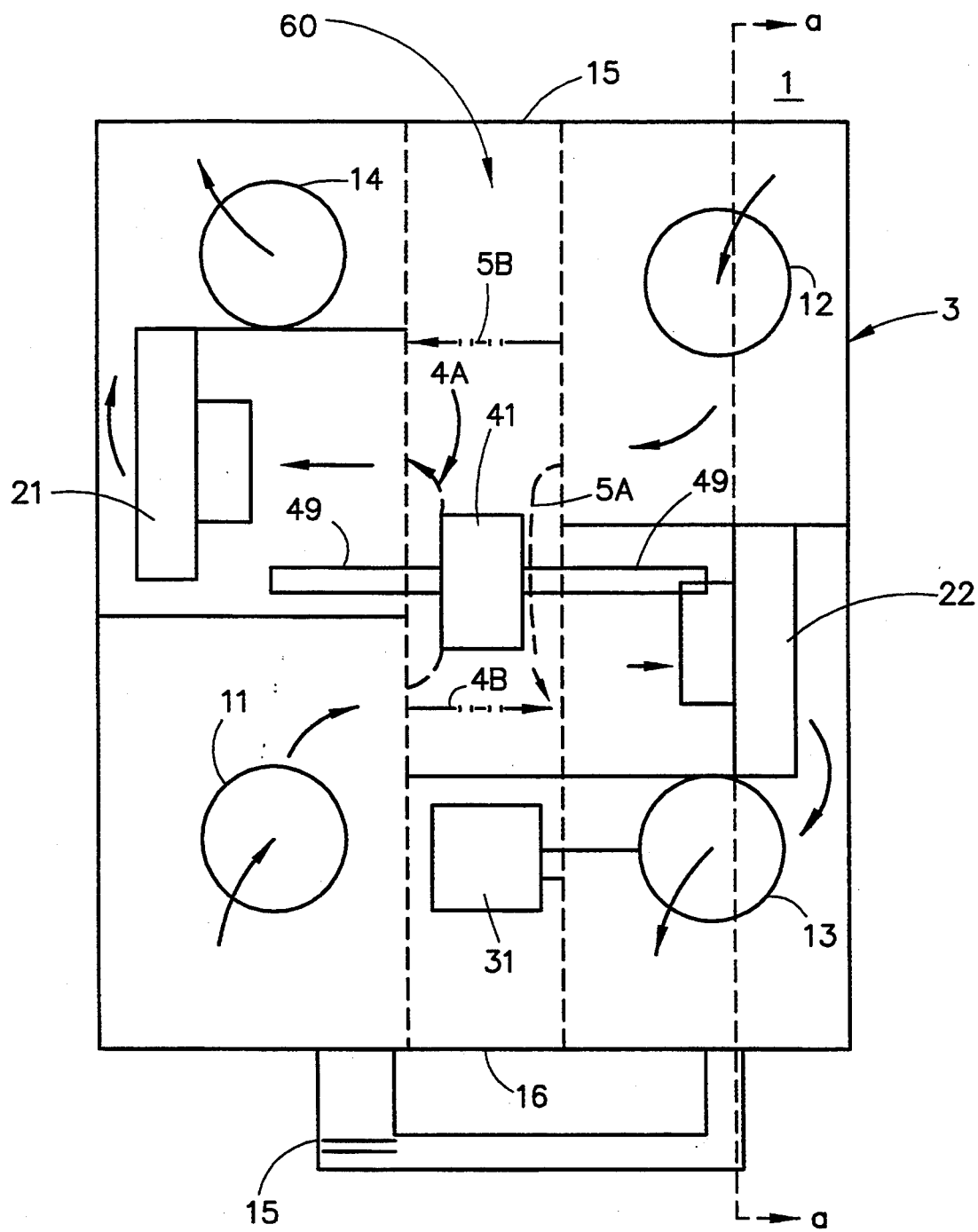
FIG. 1 illustrates the front view of the Energy Recovery Ventilator (ERV) and the position of key internal components.

FIG. 1 illustrates the from view of Energy Recovery Ventilator 1 (ERV) with internal component location illustrates for reference ERV 1 comprises 4 ports: two input ports, 11 and 12, and two output ports, 13 and 14. The ports are connected to air ducts (not shown). The duct connected to the input port 11 provides outside air to ERV 1. The ducts connected to input port 12 provides indoor air to ERV 1. The ducts connected to output ports 13 and 14, either vent the fresh outdoor air into the home or exhaust the indoor air outside, dependent upon which heat-exchanger is utilized. This is explained further within the explanation of FIG. 3. ERV 1 further comprises blowers 21 and 22, pressure switch 31, damper motor 41, and humidity recovery means 51.

Figure 2:
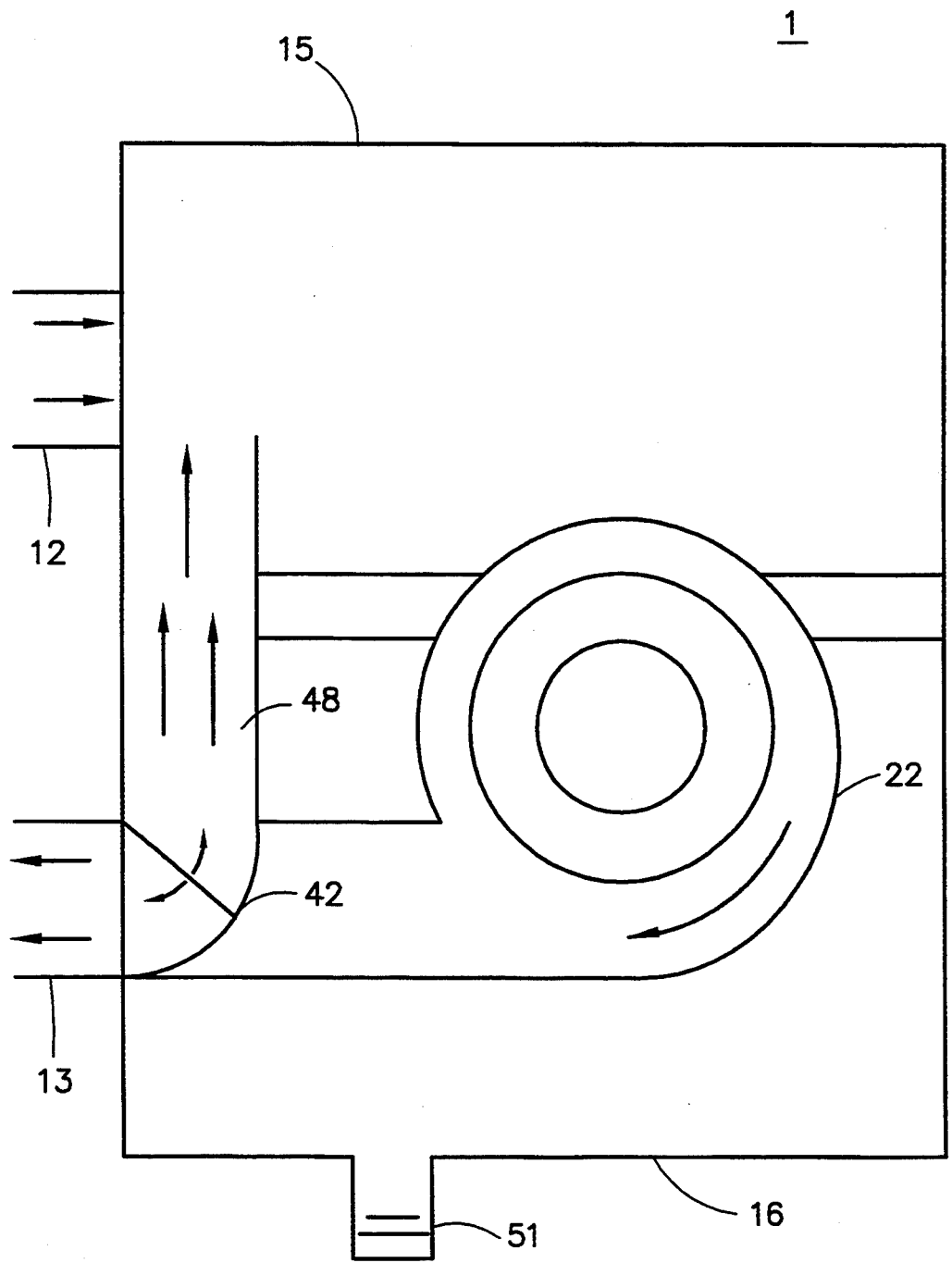
FIG. 2 illustrates the side view of the ERV.
Figure 3A:
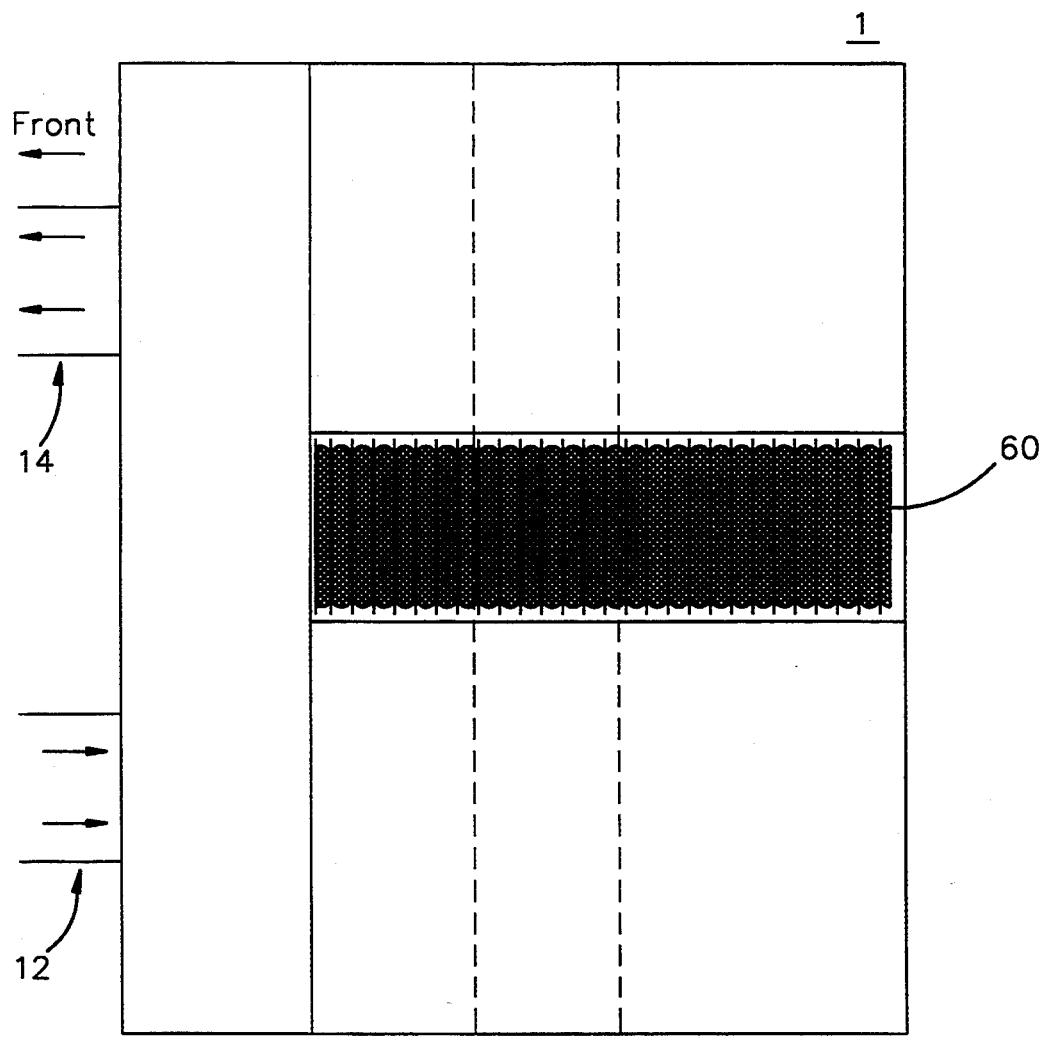
FIG. 3A illustrates the top view of the ERV with a first heat-exchanger.

FIG. 2 illustrates the side view of ERV 1 along axis (cut line) a—a. Blower 22 forces air out vent 13 when damper 42 is in an open position. FIG. 3A is the top view of ERV 1 with the top wall 15 removed. In FIG. 3A, a first heat-core 60 is utilized to exchange the heat of the warm air and the colder air. Heat-core 60 is further illustrated in FIGS. 9 through 11. When heat-exchanger 60 is utilized, outside air flows into ERV 1 through port 11 and into the building through port 14. Interior air is brought in through port 12 and exhausted out through port 13. The normal air flow, 4a and 5a, is illustrated in FIG. 1. Heat-core 60 is designed to be used in colder climates where a greater thermal exchange must take place between the incoming air and the outgoing air. This requires greater thermal efficiency level than provided by heat-exchanger 62.

Figure 9:
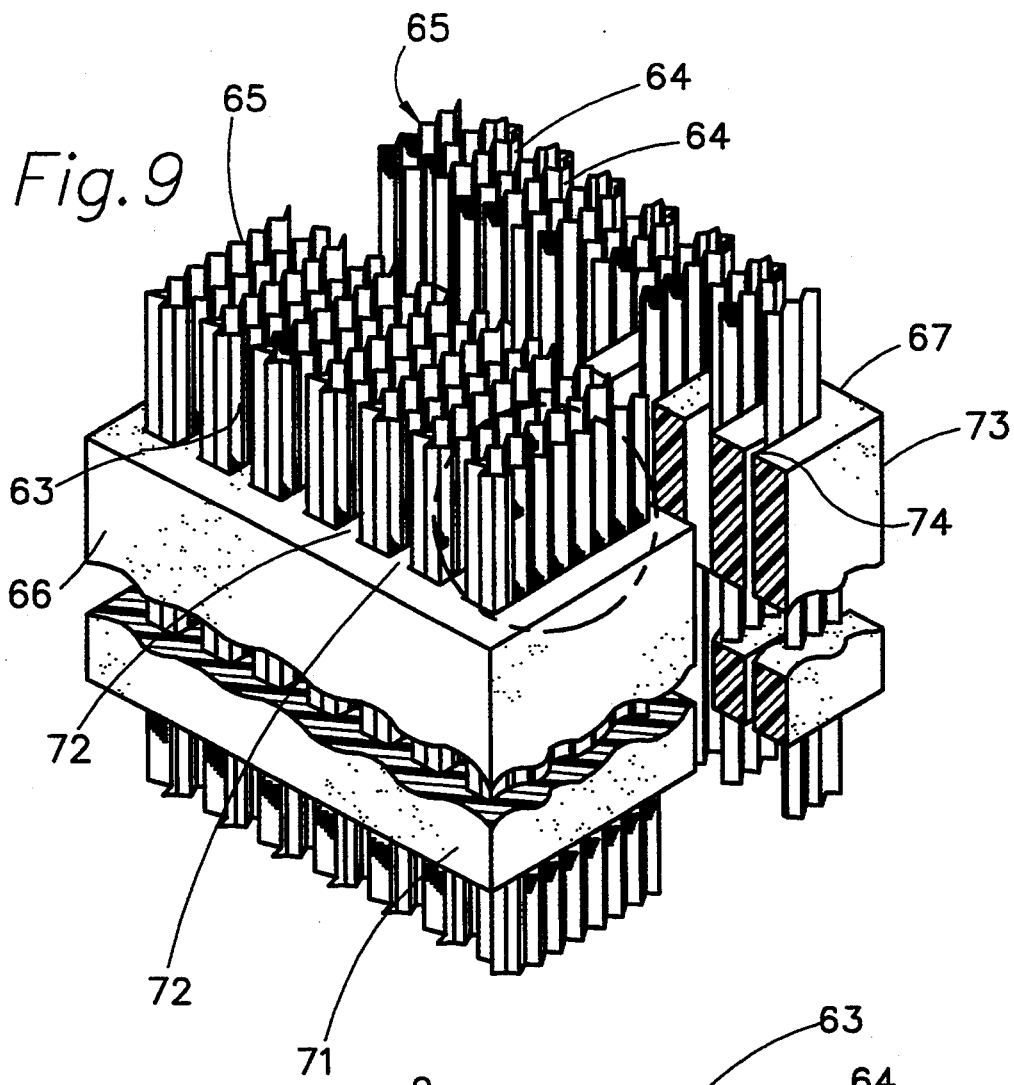
FIG. 9 illustrates the first heat-exchanger.
Figure 10:
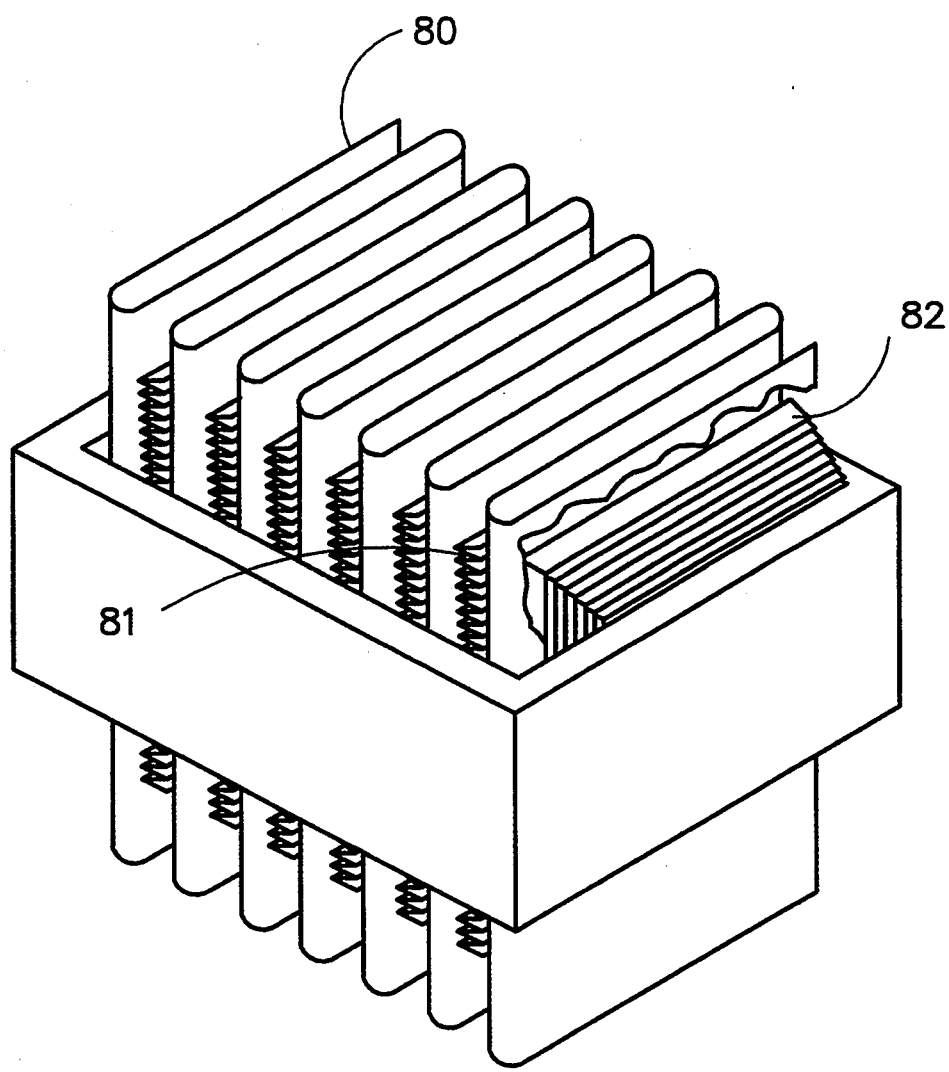
FIG. 10 illustrates a second embodiment of the first heat-exchanger.

Referring to FIG. 9, heat core 60 is positioned from the bottom wall 16 upwardly to the top wall 15 of housing 3. Heat core 60 is sealed in housing 3 by means of foam or other ceiling means. Heat core 60 is mounted in housing 68 illustrated in FIG. 11. Top wall 69 is in contact with top wall 15 of housing 3. Bottom wall 70 is in contact with bottom wall 16 of housing 3. Housing 68 must be positioned so as to allow air flow 4a to enter in through opening 84 and exit through opening 83.

Figure 3B:
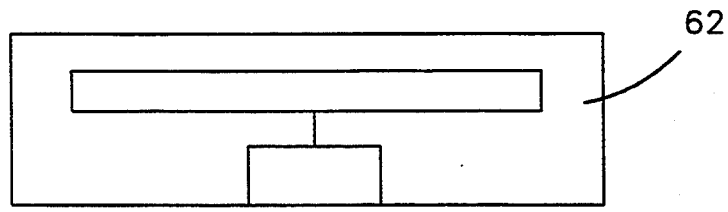
FIG. 3B illustrates a second heat-exchanger.

FIG. 3B is a second heat-exchanger 62 which can replace first heat-core 60 based on the climatic requirements. Heat-exchanger 62 is a rotary core heat-exchanger. In a rotary core heat-exchanger, a porous plastic wheel slowly revolves between the two air-streams, picking up heat from the warm airstream and transferring it to the cold airstream. Rotary cores can transfer appreciable amounts of moisture between airstreams. When heat-exchanger 62 is utilized, outside air flows in through port 11 and into the home through port 13. Interior air flows into port 12 and is exhausted through port 14. The air flow for heat exchanger 62 is illustrated in FIG. 1. Air flow 4b illustrates outside air flowing into ERV 1 through port 11 through heat exchanger 62 and out through port 13. Air flow 5b illustrates indoor air flowing into ERV 1 through port 12 through heat-exchanger 62 and out port 14.

In those instances when it is warmer outdoors than indoors, heat is transferred from the outdoor air to the indoor air as the two airstreams travel through the heat-exchangers. This heat transfer raises the indoor air temperature to a temperature intermediate to the outdoor and indoor temperatures. Ignoring any minor heating effects by the motors of the fans, the heat transfer efficiency, E, may be defined as follows:

$$E=(T_o-T_e)/(T_o-T_i)$$

wherein $T_o$ is the outdoor temperature, $T_e$ is the temperature of the outdoor air as it enters the indoors, and $T_i$ is the indoor temperature. For example, if the efficiency of the heat-exchangers is 0.5, the outdoor temperature is 80° F., and the indoor temperature is 60° F.; $T_e$ will equal 70° F. $T_e$ will more closely approach the indoor temperature as the efficiency increases and, at a theoretical maximum efficiency of 1.0, these two temperatures will be equal.

Similarly, if the outdoor air is colder than the indoor air, heat is transferred from the indoor air to the outdoor air. This heat transfer raises the outdoor air temperature to a temperature intermediate the outdoor and indoor temperatures. In such instances, again ignoring any heating effects by the fans, E may be defined by the equation:

$$E=(T_i-T_e)/(T_i-T_o)$$

wherein the symbols have the same meaning as above. Assuming $T_o$ is 60° F., $T_i$ is 80° F. with an efficiency of 0.5; $T_e$ will again equal 70° F.

Heat-core 60, in accordance with the present invention, has a high efficiency such that the temperature of the outdoor air entering the room approaches the indoor temperature as closely as possible. Preferably, the efficiency is from about 0.5 to about 0.8 so that the temperature difference between the outdoor air that enters the room and the indoors will be minimized. This is especially important in northern climates, when the temperature difference between the indoors and outdoors is greatest during the coldest months of the year.

Referring to FIG. 9, heat-core 60 is formed of a continuous sheet of material which is formed in a serpentine structure which defines a plurality of alternating first channels 63 and second channels 64 which are separated from each other by generally parallel walls 65. The structure in FIG. 9 is made up of corrugated aluminum which is shown in greater detail in FIG. 9A. The walls 65 are as compactly spaced as possible without creating any metal-to-metal contact and are preferably generally parallel to one another. The first channels each open toward a front wall 66 and are closed toward rear wall 67. The second channels open toward rear wall 67 and are closed toward front wall 66. To achieve a high heat transfer efficiency, the heat-exchangers are preferably composed of aluminum-based material having a high thermal conductivity. Although aluminum is the preferred embodiment, others materials, such as polystyrene, may be used. Both polystyrene and aluminum are also lightweight and thus contribute to the low weight of heat-core 60.

As shown in FIG. 9, heat-exchanger 60 preferably includes a front separating framework 71, preferably formed of a lightweight material, such as foam or plastic, and having a plurality of parallel spacers 72 which extend at least partially into first channels 63 toward the rear wall. The spacers prevent the metal-to-metal contact of corrugated walls 65. The spacers also diffuse the air as it flows through the heat-exchanger and, thus, increase the efficiency. Rear separating framework 73, also preferably formed of a lightweight material, has a plurality of spacers 74 which extend at least partially into second channels 64 toward the front wall.

Figure 9A:
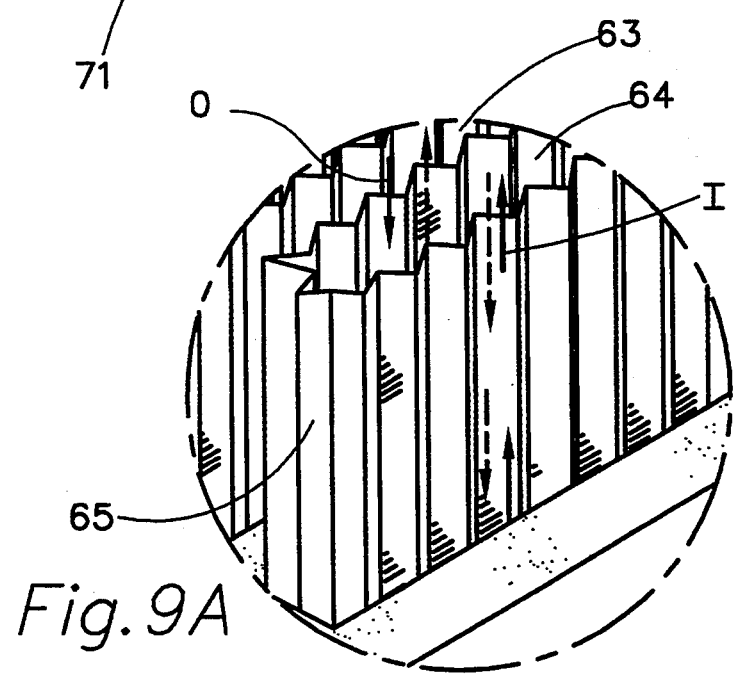
FIG. 9A illustrates a cutaway view of the heat-exchanger of FIG. 9.

FIG. 9A is an enlarged view of the encircled portion of heat-core 60, illustrated in FIG. 9. The upwardly directed arrows, I, represent the flow of indoor air through second channels 64, and downward directed arrows, 0, represent the flow of outdoor air through first channels 63. The corrugated walls 65 provide two important functions with respect to the airflow through the heat-exchangers. First, the indoor and outdoor airstreams are prevented from mixing with each other. Second, the corrugated wall structure provides an increased amount of wall surface area to increase the heat exchange efficiency between the two airstreams.

Figure 11:
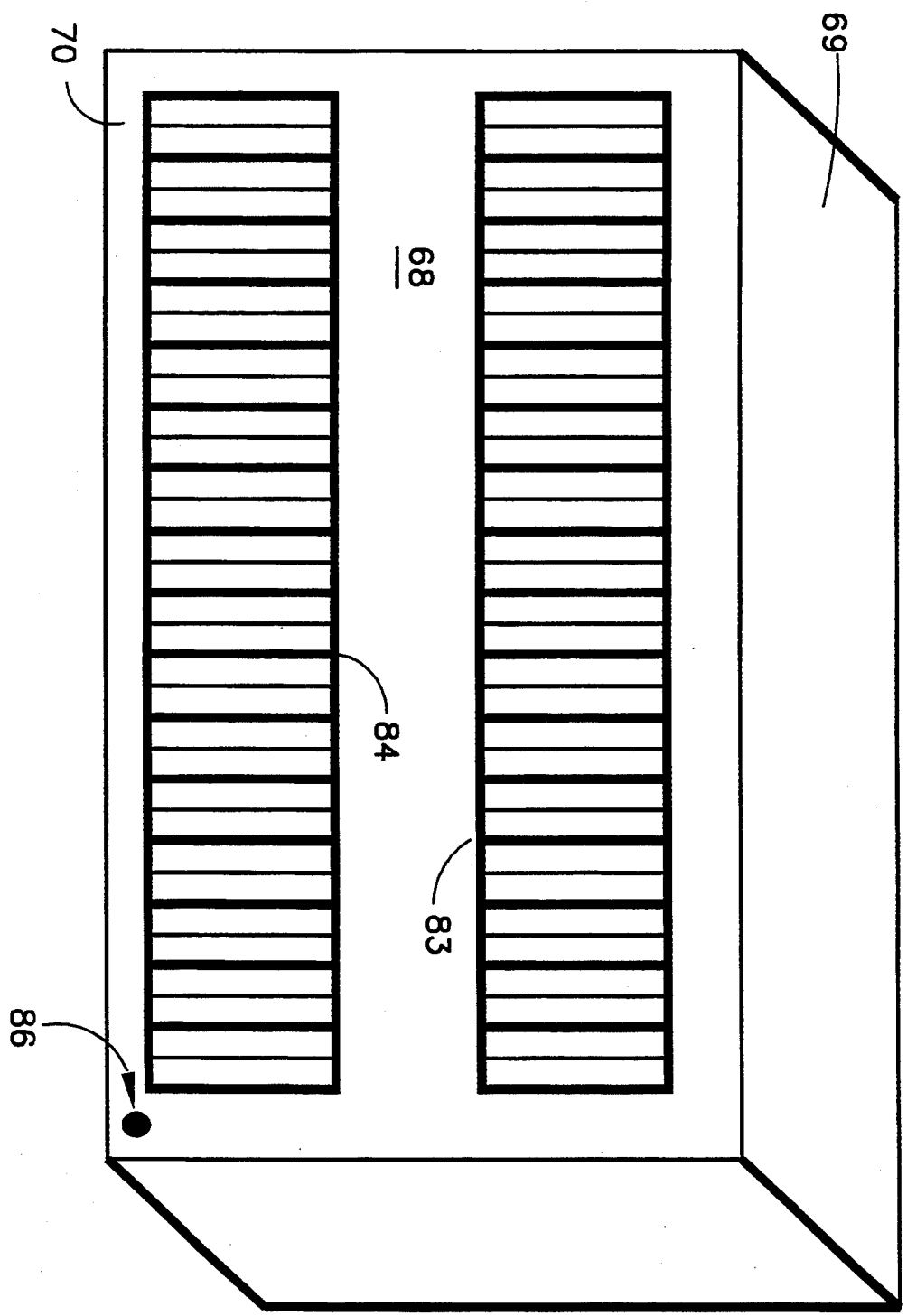
FIG. 11 illustrates the housing enclosing the first heat-exchanger.

The upper and lower portions of heat-core 60 are sealed in housing 68 illustrated in FIG. 11. The seals are in an airtight relationship to top 69 and bottom 70 walls, respectively, of housing 68. The sealant is preferably a liquid sealant which hardens to seal the heat-core. The airtight seals assure that the indoor and outdoor airstreams remain separated from each other as they travel through heat-core 60. Although only one side of housing 68 is shown, openings are provided on both sides of housing 68. Indoor air passes into opening 83 and is exhausted out opening 84. This air flow is shown as air flow 4a in FIG. 1. Similar openings are provided in the other side of housing 68 to provide for outdoor air to be passed into heat-core 60 and passed out into the building. Indoor air flows from the top of heat-core 60 down so that, as frost builds up, it accumulates on the bottom of heat-core 60. Outside air flows from the bottom up to maximize heat exchange.

As discussed above, ERV 1 allows for multiple heat-exchangers to be utilized. The installer only changes the to output ports based on which heat-exchanger is utilized. When a rotary core such as heat-exchanger 62 is utilized, airflow is horizontal across ERV 1, as depicted by arrows 4b and 5b. As discussed earlier, ERV 1 is designed to utilize different constructions based on the local climate in which it is installed. A rotary core, such as heat-exchanger 62, is utilized in milder climates where the moisture exchange of the rotary core will prevent the indoor air from becoming too dry. However, hem-core 60 is utilized in much harsher climates, such as the upper midwest and Canada.

When heat-core 60 is used, two dampers 42 and 43 and pressure switch 31 are incorporated to defrost heat-core 60. In colder climates, the air inside a building will be much warmer and contain more moisture than the air outside. As the air passes through heat-core 60, the moist air being exhausted outside will be chilled as it passes through heat-core 60. Similar to the inside of a freezer, frost will buildup as the moisture from the inside air is cooled on heat-core 60. As the moisture builds up on heat-core 60, ERV 1 no longer functions efficiently. Therefore, an inventive method has been adopted to reduce this condition.

A number of methods have been tried in the prior art to prevent frost buildup and/or defrost flat plate cores used as heat-exchangers. One method is at periodic intervals to turn on an electronic heater which will heat the core and melt any frost buildup. This method, however, utilizes energy to defrost the core which reduces the efficiency of the ERV. Further, some of these systems use timers to determine when the defrost cycle is needed. This assumes that the need for the defrost cycle will be on a general periodic cycle. This, however, is not true; the need for the defrost cycle is based on the moisture in the air and the temperature of the outside air.

Figure 8:
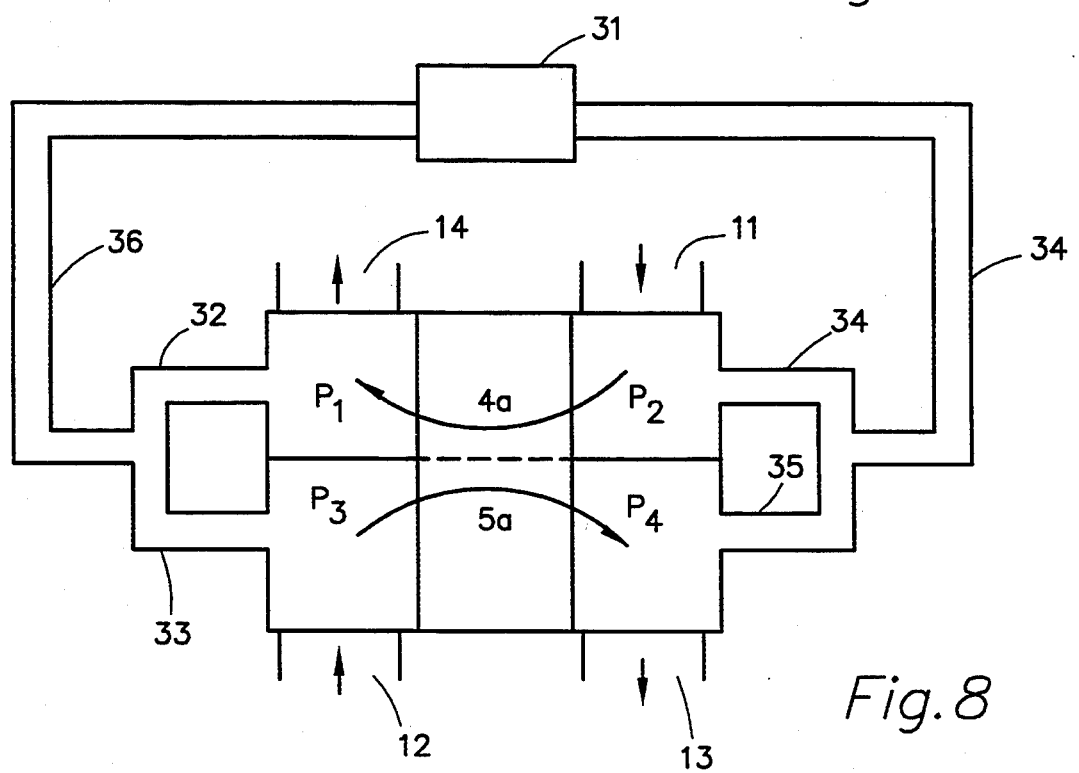
FIG. 8 illustrates the pressure switch.

To determine when the defrost cycle is needed, a unique pressure switch is incorporated. FIG. 8 illustrates pressure switch 31. The configuration of ERV 1 is distorted to better show the operation of pressure switch 31. The pressure switch operates by comparing incoming and outgoing air pressures at heat-core 60. As described in FIG. 11, housing 68 has four openings which allow indoor air and outdoor air to flow without being mixed. Heat-core 60 at input port 11 is at a first pressure $P_2$, and heat-core at input port 12 is at a second pressure $P_3$. Heat-core 60 at output ports 13 and 14 are at pressures $P_4$ and $P_1$, respectively. Pressure switch 51 uses tubes to assist in measuring the pressures. Tube 33 is located in close proximity to heat-core 60 near 12 and is at pressure $P_3$. Tube 32 is located in close proximity to heat-core 60 near port 14 and is at pressure $P_1$. Tube 34 is located in close proximity to heat-core 60 near port 11 and is at pressure $P_2$. Tube 35 located in close proximity to heat-core 60 near is connected to the core at port 13 and is at pressure $P_4$. Tube 36 is connected at the junction of tubes 32 and 33. As a result, the pressure at tube 36 is at the mean average pressure of $P_1$ and $P_3$ ($\Delta P_{1-1}$ 3). Tube 37 is connected at the junction of tubes 34 and 35. As a result, the pressure in tube 37 is at the mean average pressure of $P_2$ and $P_4$ ($\Delta P_{2-4}$). Pressure switch 31 then senses the difference between $\Delta P_{1-3}$ and $\Delta P_{2-4}$. When a difference between $\Delta P_{1-3}$ and $\Delta P_{2-4}$ exists above a predetermined threshold, pressure switch 31 closes and indicates a pressure differential exists. When a balance is achieved, pressure switch 31 opens and indicates that air flows 4a and 5a are balanced. During normal operation, $P_1$ may be at $-15$ psi and $P_3$ may be at $-5$ psi, setting $\Delta P_{1-3}$ at $-10$ psi. $P_2$ may be at $-20$ psi and $P_4$ will be at 0 psi, setting $\Delta P_{2-4}$ at $-10$ psi. Thus, the difference seen by pressure switch 31 is 0. When the core frosts up, the pressure at port 13 will decrease to say $-15$ psi. $\Delta P_{2-4}$ will then decrease to $-12.5$ psi, and the difference seen by pressure switch 31 will be $-2.5$ psi, closing pressure switch 31.

Figure 5:
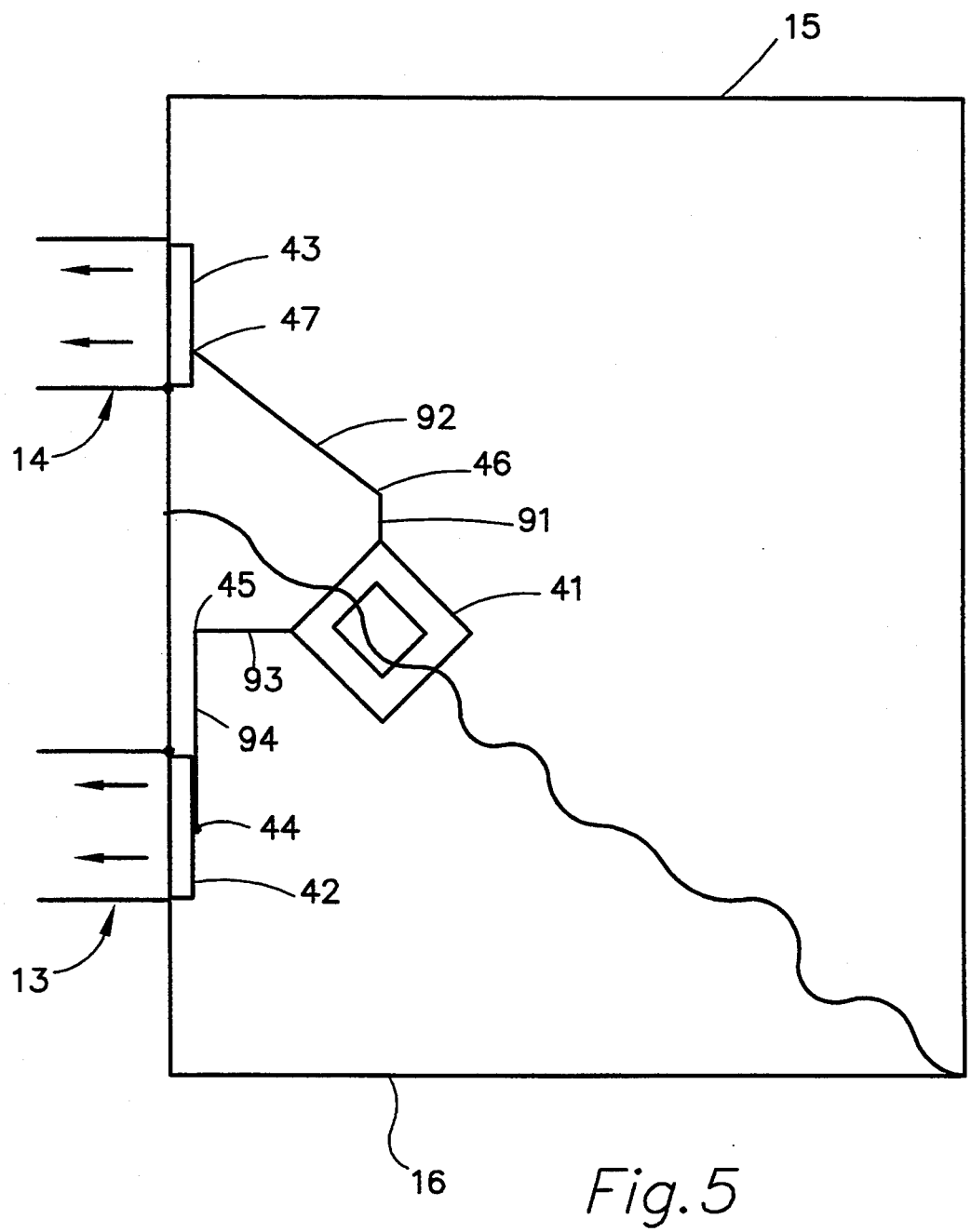
FIG. 5 illustrates the defrost mechanism in the closed position.
Figure 6:
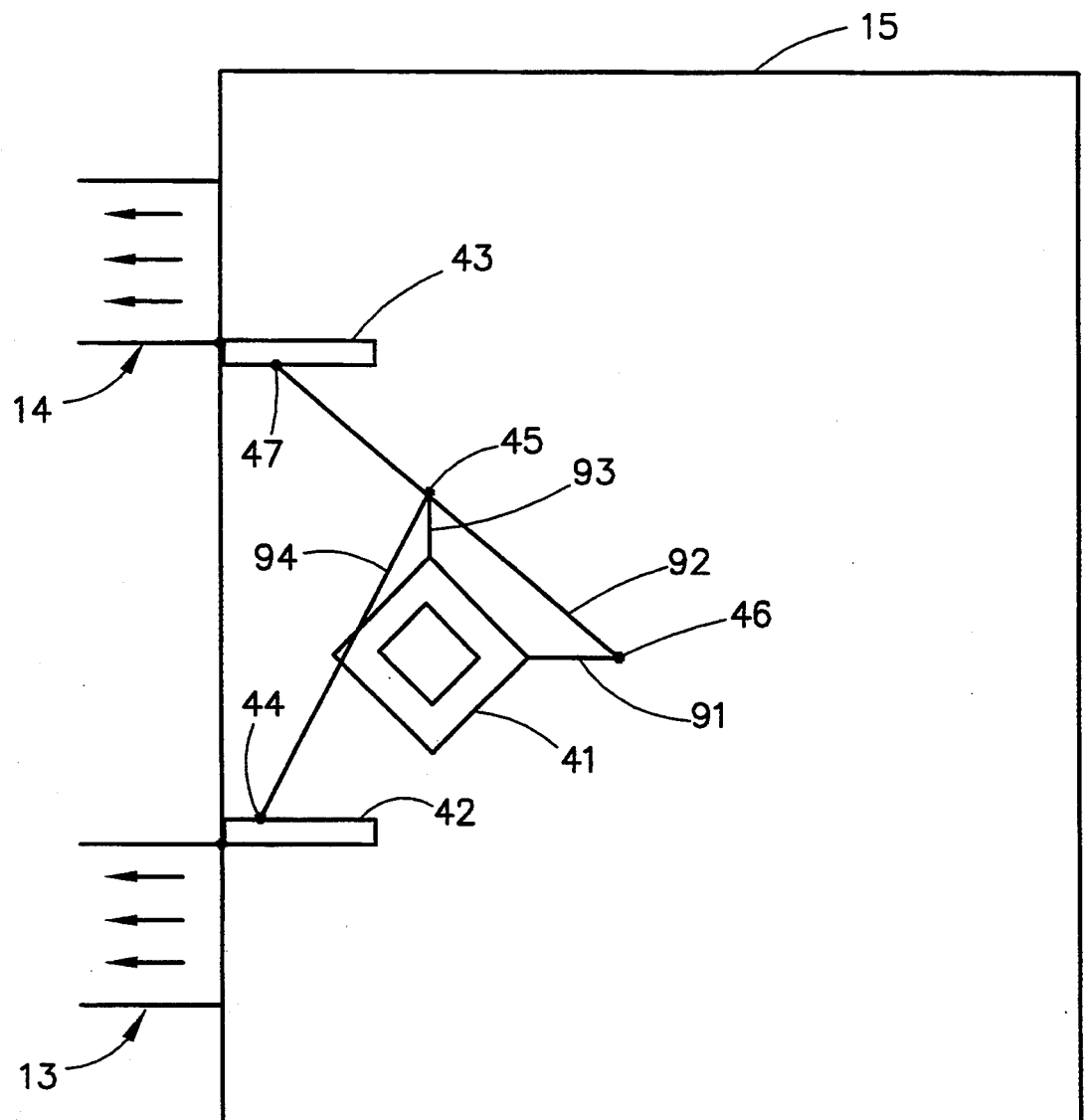
FIG. 6 illustrates the defrost mechanism in the open position.

When pressure switch 31 closes, dampers 42 and 43, shown in FIGS. 5 and 6, are closed. When dampers 42 and 43 are closed, bypasses are provided, as shown in FIG. 2. (FIG. 2 only illustrates a cut away view of the right side of ERV 1, a similar bypass exists on the left half of ERV1 for damper 43). Bypass 48 allows outside air to continually recycle through to heat-core 60. A similar bypass is on the other side of the ERV 1 which allows the indoor air to continually recycle. The recycled air is warmed by the waste heat from the motors of blowers 21 and 22. Blowers 21 and 22 are switched to high to increase the waste heat and increase the airflow. When the frost is completely melted, pressure switch 31 opens and opens dampers 42 and 43, returning ERV 1 to normal operation.

Dampers 42 and 43 are opened and closed by means of motor 41, which only turns 90 degrees. Motor 41 has a shaft the extends horizontally out to arms 91 and 93. Arm 91 is connected to hinge 46. Hinge 46 hinges the movement of arms 91 and 92. The opposing end of arm 92 is then connected to damper 43 by means of hinge 47. Arm 93 is connected to arm 94 via hinge 45. The opposing end of arm 94 is connected to damper 42. By rotating 90 degrees in a clockwise manner, motor 41 opens dampers 42 and 43. By rotating in a counterclockwise manner, motor 41 closes dampers 42 and 43.

As the frost in heat-core 60 melts, it passes through drain 86, shown in FIG. 11. Drain 86 drains into re-humidifier 51. Re-humidifier is only used when the indoor air is dry. In homes which are extremely well-sealed, there may be a moisture buildup which requires that moisture be expelled from the home. In this case, obviously re-humidifier 51 would be disconnected. Where the indoor air is dry, re-humidifier 51 is energized.

Figure 7:
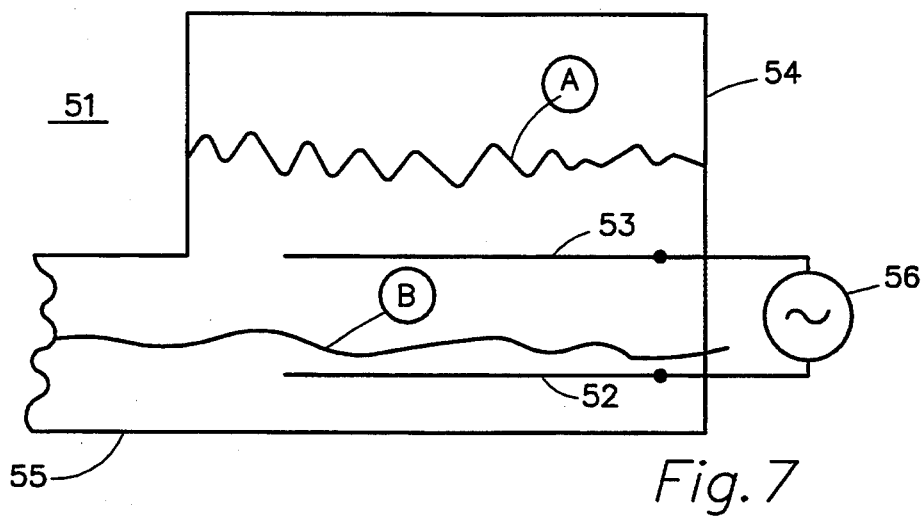
FIG. 7 illustrates the re-humidifier.

Re-humidifier 51 is shown in FIG. 7 and comprises tube 55 from the core at port 12 to cup 54 located below the core at port 1.4. Water drains from drain 86 into tube 55 to cup 54. In side cup 54, two plates 52 and 53 are located. Plates 52 and 53 are connected to power source 56. When the water level in cup 54 is at level "B" or below, the plates do not complete an electrical circuit. However, when the water level rises to level "A", an electrical circuit is completed between plates 52 and 53. When the electrical circuit is complete, the water is heated and evaporates into the core at port 14. As port 14 is the fresh outdoor air being vented into the home, the moisture is then reintroduced to the building.

Figure 4:
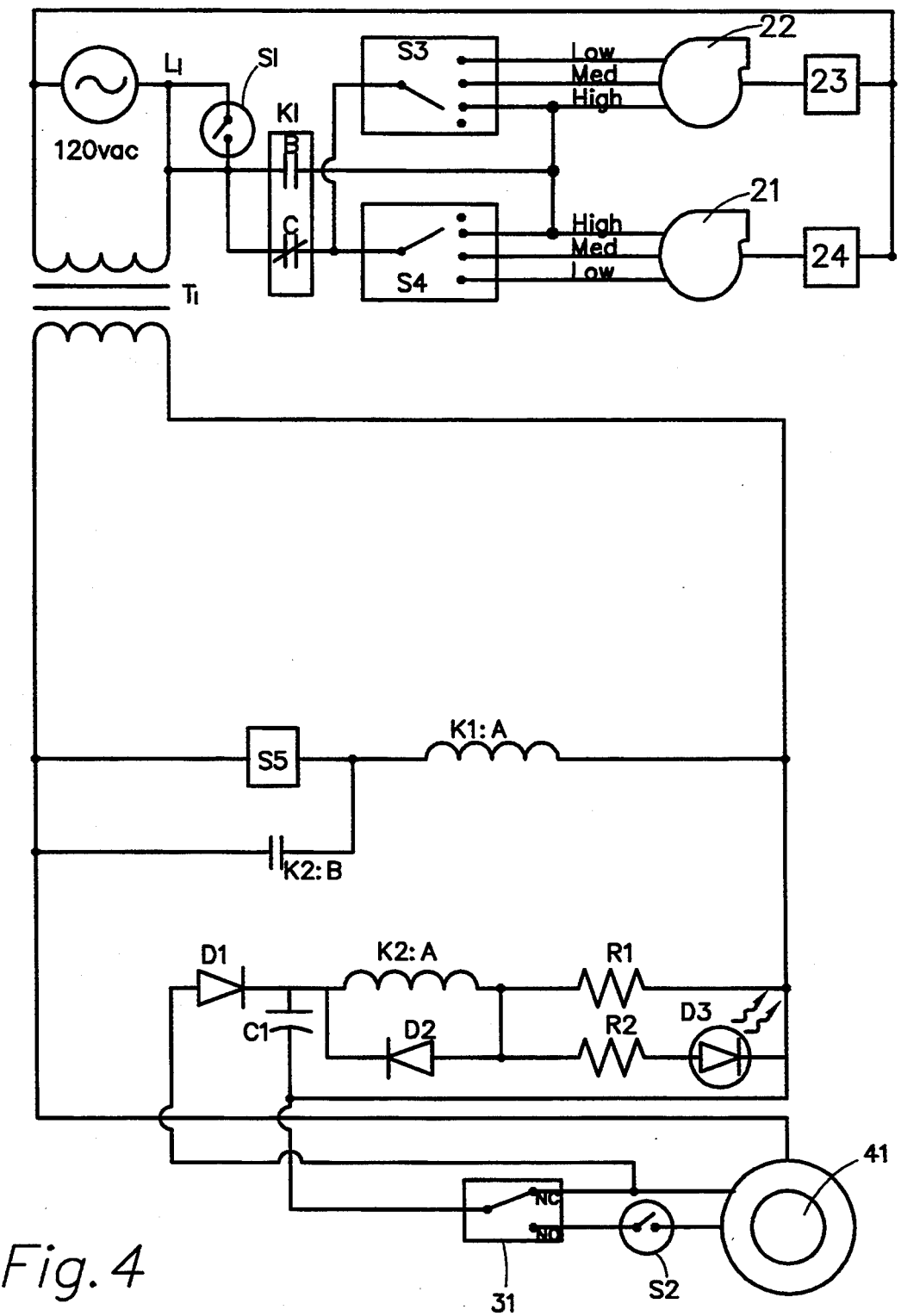
FIG. 4 is the schematic diagram of the ERV.

FIG. 4 is the schematic diagram of ERV 1. ERV 1 in operation is connected to a 120-volt ac source. The 120 volt ac source has a power terminal and a neutral terminal. The neutral terminal is electrically connected to transformer T1 and to speed controls 23 and 24. The power side of 120 volt ac source is connected to switch S1. Switch S1 is the main power switch. The output of switch S1 is then connected to transformer T1 and relay K1. Relay K1 has two contacts: normally open K1:B and normally closed K1:C. The output of normally closed contact K1:C is electrically connected to four position switches S3 and S4. Switch S3 controls the speed of blower 22 and switch S4 controls the speed of blower 21. The output of contact K1:B is electrically connected to the high speed terminals of blowers 21 and 22. Blowers 21 and 22 are electrically connected to speed controls 24 and 23, respectively.

Transformer T1 is a step-down transformer and steps the 120 volt ac signal down to 24 volts ac. The common side of the stepped down signal from transformer T1 is electrically connected to motor 41. The power side of the stepped down side of transformer T1 is electrically connected to one side of coil K1:A, a first lead of resistor R1 and the cathode of LED D3. The anode of D3 is connected to the first lead of resistor R2. The second lead of R2 is connected to the second lead of R1 and the anode of diode D2. The second lead of resistor R2 is also connected to one side of coil K2:A, the coil for relay K2. The opposing side of coil K2:A is electrically connected to the cathode of D2 and to the cathode of diode D1 as well as to capacitor C1. The opposing side of capacitor C1 is electrically connected to the power side of the stepped down side of transformer T1 and to pressure switch 31. Pressure switch 31 has two output terminals: a normally closed terminal and a normally open terminal. The normally closed terminal of pressure switch 31 is electrically connected to the anode of D1 and to motor 41. When the pressure differential sensed by pressure switch 31 is balanced, the normally closed terminal is energized and motor 41 opens dampers 42 and 43. The normally open terminal of pressure switch 31 is electrically connected through switch S2 to motor 41. When an imbalance is sensed by pressure switch 31, the normally open terminal of pressure switch 31 is energized, and dampers 42 and 43 are closed. This initiates the defrost sequence. When the defrost sequence is initiated LED D3 is illuminated and coil, K2:A is energized closing contact K2:B. Contact K2:B is connected to the common terminal of the stepped down side of transformer T1 and coil K1:A. When contact K2:B is closed, coil K1:A is energized opening contact K1:C and closing contact K1:B. This runs blowers 21 and 21 at their high speed. Switch S5 is an external switch that can be used to energize coil K1:A. When pressure switch 31 senses a balanced pressure, the dampers open and coil K1:A is de energized.

To prevent negative pressure buildup in the building, speed controls 23 and 24 are set to ensure an equal airflow into and out of the building. To balance the blowers, switch S2 is opened to prevent the dampers from closing. The blowers are set on high, and one of the speed controls is set to an extreme, either high or low. When this occurs, an imbalance will be sensed by pressure switch 31 and diode D3 will be illuminated. By adjusting the speed controls until D3 is no longer illuminated, a balance can be achieved.

References made to top, rear, front, bottom are relative to ERV 1 only and are by no means define the orientation of ERV 1. ERV 1 may be placed in any orientation, however, in the preferred embodiment the relationship shown is preferred.

I claim:

1. A pressure switch for an energy recovery ventilator, the energy recovery ventilator for exchanging indoor air with outdoor air, having a housing including a first and a second input port, and, a first and a second exhaust port, a heat exchanger core, a first blower for drawing indoor air into said energy recovery ventilator through said first input port, through said heat exchanger core and out said first exhaust port, a second blower for drawing outdoor air into said energy recovery ventilator through said second input port, through said heat exchanger core and out said second exhaust port, a pressure switch for determining if there is balanced air flow through said energy recovery ventilator, said pressure switch comprising:

means for sensing a first pressure at the heat exchanger core near said first input port;
means for sensing a second pressure at the heat exchanger core near said second input port;
means for sensing a third pressure at the heat exchanger core near said first exhaust port;
means for sensing a fourth pressure at the heat exchanger core near said second exhaust port;
means for determining a first mean average of said first pressure and said fourth pressure;
means for determining a second mean average of said second pressure and said third pressure; and
means for comparing said first mean average with said second mean average, wherein when said first mean average is substantially similar to said second mean average, said air flow is balanced, and said pressure switch indicates that air flow is balanced, wherein when said first mean average is dissimilar to said second mean average said air flow is unbalanced and said pressure switch indicates said air flow is unbalanced.

2. The pressure sensor of claim 1 wherein said pressure sensor initiates a defrost means when said air flow is out of balance.

3. The pressure sensor of claim 1 wherein said means for sensing said first, second, third, and fourth pressures comprises tubes having first and second ends and having their first ends inserted into said ports in close proximity to said heat exchanger core.

4. The pressure sensor of claim 3 wherein said means for determining said first mean average comprises a first junction of said second end of said tubes from said first port and said fourth port, and wherein said means for determining said second mean average comprises a second junction of said second end of said tubes from said second port and said third port.

* * * * *